(12) United States Patent
Salter et al.

(10) Patent No.: US 11,724,687 B2
(45) Date of Patent: Aug. 15, 2023

(54) SYSTEMS AND METHODS FOR PROVIDING TOWING ACCELERATION ASSISTANCE DURING IN-FLIGHT CHARGING OF ELECTRIFIED VEHICLES

(71) Applicant: FORD GLOBAL TECHNOLOGIES, LLC, Dearborn, MI (US)

(72) Inventors: Stuart C. Salter, White Lake, MI (US); Ryan J. O'Gorman, Beverly Hills, MI (US); Michael Blischke, Northville, MI (US); Katherine Howard-Cone, Canton, MI (US); Paul Kenneth Dellock, Northville, MI (US); Hussein Berry, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 230 days.

(21) Appl. No.: 17/224,165

(22) Filed: Apr. 7, 2021

(65) Prior Publication Data
US 2022/0324433 A1    Oct. 13, 2022

(51) Int. Cl.
*B60W 20/19*      (2016.01)
*B60L 15/20*      (2006.01)
*B60D 1/24*       (2006.01)

(52) U.S. Cl.
CPC ............... *B60W 20/19* (2016.01); *B60D 1/24* (2013.01); *B60L 15/20* (2013.01)

(58) Field of Classification Search
CPC ........... B60W 20/19; B60D 1/24; B60L 15/20
See application file for complete search history.

(56) References Cited

U.S. PATENT DOCUMENTS

| 4,311,334 A | * | 1/1982 | Jenkins | B62D 35/001 |
| | | | | 105/20 |
| 8,548,712 B2 | * | 10/2013 | Oesterreicher | B60W 50/0205 |
| | | | | 318/432 |
| 8,700,284 B2 | | 4/2014 | Wojtkowicz et al. | |
| 9,586,485 B2 | * | 3/2017 | Badger | B60L 1/003 |
| 2013/0079980 A1 | * | 3/2013 | Vuk | B62D 59/04 |
| | | | | 701/36 |
| 2014/0188318 A1 | | 7/2014 | Langgood et al. | |
| 2015/0203103 A1 | * | 7/2015 | Kobayashi | B60K 6/48 |
| | | | | 180/65.265 |
| 2020/0164890 A1 | * | 5/2020 | Shin | B60W 40/107 |

* cited by examiner

*Primary Examiner* — Gertrude Arthur Jeanglaude
(74) *Attorney, Agent, or Firm* — David B. Kelley; Carlson, Gaskey & Olds, P.C.

(57) ABSTRACT

Systems and methods for coordinating and providing towing acceleration assistance between towing vehicles and towed vehicles during vehicle towing events are disclosed. The towing acceleration assistance may be provided by the towed vehicle in the form of an assistive propulsive torque to assist the towing vehicle with acceleration during the towing event when one or more vehicle conditions indicate a need for the towing acceleration assistance. The towing acceleration assistance may end when the one or more vehicle conditions no longer indicate the need for the towing acceleration assistance.

20 Claims, 5 Drawing Sheets

SYSTEMS AND METHODS FOR PROVIDING TOWING ACCELERATION ASSISTANCE DURING IN-FLIGHT CHARGING OF ELECTRIFIED VEHICLES

TECHNICAL FIELD

This disclosure is directed to vehicle systems and methods for providing towing acceleration assistance during vehicle-to-vehicle towing events.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are typically charged while parked at a charging station or some other utility power source.

SUMMARY

A vehicle-to-vehicle in-flight energy transfer system according to an exemplary aspect of the present disclosure includes, among other things, a towing vehicle, a towed vehicle, and a control module programmed to request a torque assistance from the towed vehicle for assisting with acceleration of the towing vehicle in response to a predefined torque condition, a predefined throttle condition, or a wheel slip condition of the towing vehicle.

In a further non-limiting embodiment of the foregoing system, the towing vehicle is a smaller vehicle than the towed vehicle.

In a further non-limiting embodiment of either of the forgoing systems, the towed vehicle is coupled to the towing vehicle by a towing device during a towing event in which the torque assistance is requested.

In a further non-limiting embodiment of any of the foregoing systems, the towing event is an in-flight bidirectional charging towing event.

In a further non-limiting embodiment of any of the foregoing systems, the control module is a component of the towing vehicle.

In a further non-limiting embodiment of any of the foregoing systems, the control module is programmed to request an end to the torque assistance when the predefined torque condition, the predefined throttle condition, or the wheel slip condition ceases.

In a further non-limiting embodiment of any of the foregoing systems, the predefined torque condition is a condition in which a torque output of an electric machine of the towing vehicle exceeds a predefined maximum torque threshold.

In a further non-limiting embodiment of any of the foregoing systems, the predefined throttle condition is a condition in which a position of an accelerator pedal of the towing vehicle exceeds a predefined maximum throttle pedal position.

In a further non-limiting embodiment of any of the foregoing systems, the wheel slip condition is a condition in which a wheel of the towing vehicle is slipping while the towing vehicle is either stopped or operating on a graded portion of a roadway.

In a further non-limiting embodiment of any of the foregoing systems, the control module is programmed to communicate a torque assist request signal to the towed vehicle for requesting the torque assistance.

In a further non-limiting embodiment of any of the foregoing systems, the control module is programmed to communicate a torque assist end signal to the towed vehicle for ending the torque assistance.

In a further non-limiting embodiment of any of the foregoing systems, the torque assist end signal is communicated when a torque output of an electric machine of the towing vehicle falls below a predefined maximum torque, when a position of an accelerator pedal is less than a predefined maximum throttle pedal position, when the towing vehicle reaches a predefined speed, or when wheel slippage of the towing vehicle has not been detected for a predefined amount of time.

In a further non-limiting embodiment of any of the foregoing systems, the torque assist end signal is communicated when the acceleration of the towing vehicle is within a predefined percentage of a normal acceleration of the towing vehicle for a given torque output of an electric machine of the towing vehicle.

An electrified vehicle according to another exemplary aspect of the present disclosure includes, among other things, a wheel, an electric machine for selectively providing a propulsive torque for propelling the wheel, and a control module programmed to control the electric machine for providing the propulsive torque in response to receiving a torque assistance request signal during a towing event.

In a further non-limiting embodiment of the foregoing electrified vehicle, the torque assistance request signal is received from a second electrified vehicle.

In a further non-limiting embodiment of either of the foregoing electrified vehicles, a telecommunications module is configured for establishing bidirectional communications between the electrified vehicle and the second electrified vehicle.

In a further non-limiting embodiment of any of the foregoing electrified vehicles, the control module is a component of the electrified vehicle being towed during the towing event.

In a further non-limiting embodiment of any of the foregoing electrified vehicles, the torque assistance request signal is indicative of a torque condition, a throttle condition, or a wheel slip condition of a towing vehicle involved in the towing event.

In a further non-limiting embodiment of any of the foregoing electrified vehicles, the control module is programmed to control the electric machine for stopping the propulsive torque in response to receiving a torque assistance end signal during the towing event.

A method according to another exemplary aspect of the present disclosure includes, among other things, during a towing event in which a towing vehicle is towing a towed vehicle, providing a torque assistance from the towed vehicle for aiding acceleration of the towing vehicle in response to a predefined torque condition, a predefined throttle condition, or a wheel slip condition of the towing vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to systems and methods for coordinating and providing towing acceleration assistance between towing vehicles and towed vehicles during vehicle towing events. The towing acceleration assistance may be provided by the towed vehicle in the form of an assistive propulsive torque to assist the towing vehicle with acceleration during the towing event when one or more vehicle conditions indicate a need for the towing acceleration assistance. The towing acceleration assistance may end when the one or more vehicle conditions no longer indicate the need for the towing acceleration assistance. These and other features of this disclosure are discussed in greater detail in the following paragraphs of this detailed description.

Figure 1:
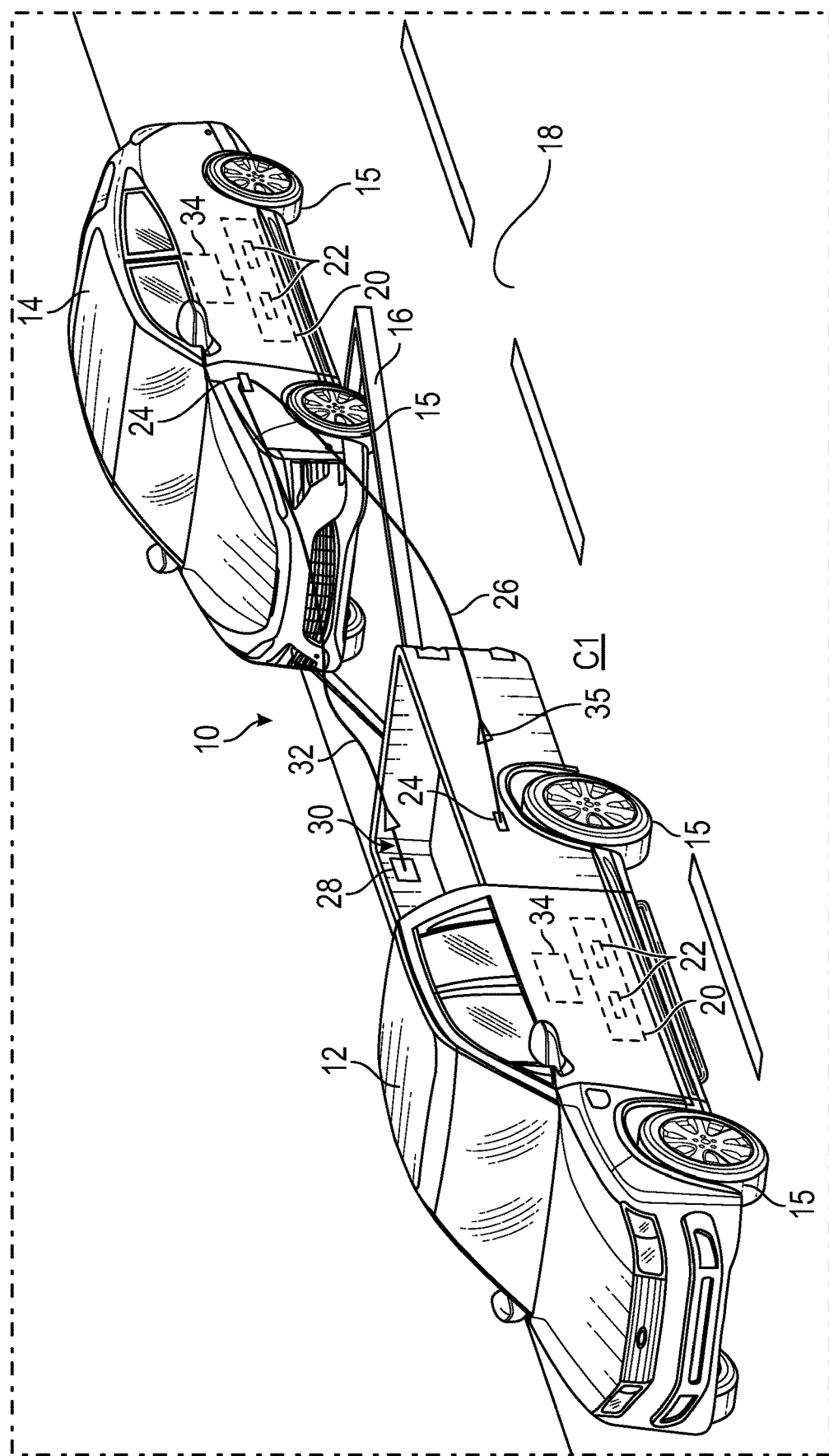
FIG. 1 schematically illustrates a first in-flight configuration of a vehicle-to-vehicle energy transfer system during a towing event.
Figure 2:
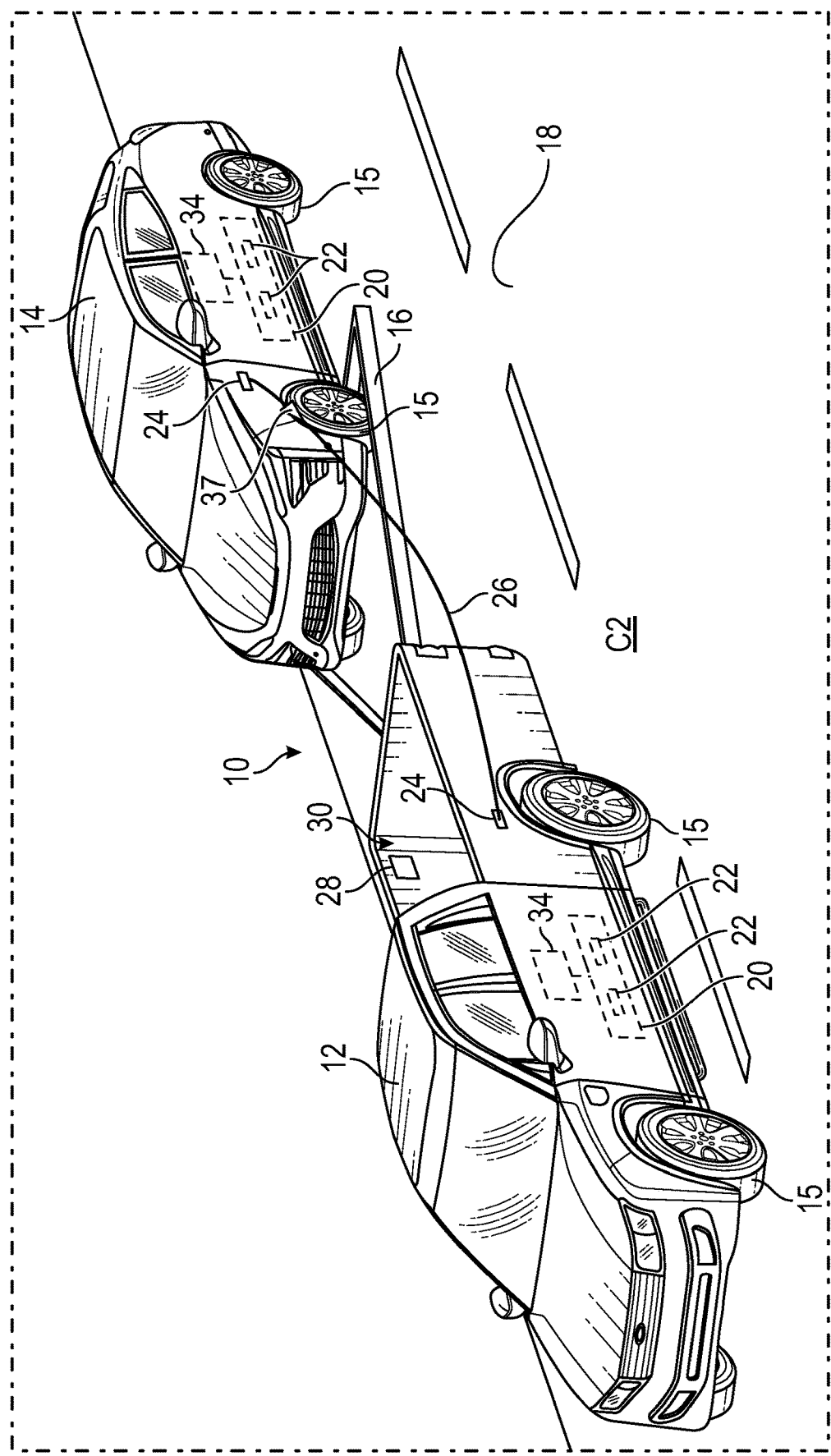
FIG. 2 schematically illustrates a second in-flight configuration of the vehicle-to-vehicle energy transfer system of FIG. 1.

FIGS. 1 and 2 schematically illustrate an exemplary vehicle-to-vehicle (V2V) in-flight energy transfer system 10 (hereinafter "the system 10") for bidirectionally transferring energy between a towing or leading vehicle 12 and a towed or trailing vehicle 14 during a towing event. In this disclosure, the term "in-flight" means during the coupled movement of the leading vehicle 12 and the trailing vehicle 14. Accordingly, the system 10 enables the bidirectional transfer of energy from the leading vehicle 12 to the trailing vehicle 14 or vice-versa while the leading and trailing vehicles 12, 14 are making forward progress toward their desired destinations.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

The in-flight energy transfer afforded by the system 10 is beneficial to both participating parties. For example, the user/owner of the trailing vehicle 14 may take advantage of the time while being towed by resting, sleeping, eating, working, etc., and the user/owner of the leading vehicle 14 may generate income for performing the towing/charging task (i.e., revenue opportunity).

A towing device 16 may releasably couple the trailing vehicle 14 relative to the leading vehicle 12 to allow the leading vehicle 12 to pull the trailing vehicle 14 along a roadway 18 and thus control driving of the trailing vehicle 14 during a towing event. The towing device 16 could by any type of towing device. Accordingly, the specific configuration of the towing device 16 is not intended to limit this disclosure.

In an embodiment, the leading vehicle 12 and the trailing vehicle 14 are both plug-in type electrified vehicles (e.g., a plug-in hybrid electric vehicle (PHEV) or a battery electric vehicle (BEV)). Each of the leading and trailing vehicles 12, 14 includes a traction battery pack 20. The leading vehicle 12 and the trailing vehicle 14 may each include an electrified powertrain capable of applying a propulsive torque from an electric machine (e.g., an electric motor) for driving drive wheels 15 of the leading and trailing vehicles 12, 14. Therefore, the powertrain of each of the leading vehicle 12 and the trailing vehicle 14 may electrically propel the respective set of drive wheels 15 either with or without the assistance of an internal combustion engine.

Although shown schematically, each traction battery pack 20 may be configured as a high voltage traction battery pack that includes a plurality of battery arrays 22 (i.e., battery assemblies or groupings of battery cells) capable of outputting electrical power to one or more electric machines of each vehicle. Other types of energy storage devices and/or output devices may also be used to electrically power each of the leading vehicle 12 and the trailing vehicle 14.

From time to time, charging the energy storage devices of the traction battery pack 20 of each of the leading vehicle 12 and the trailing vehicle 14 may be required or desirable. Each of the leading and trailing vehicles 12, 14 may therefore be equipped with a charging system that includes a charge port assembly 24. A charge cable 26 (i.e., EVSE) may be connected to the corresponding charge port assemblies 24 of the leading and trailing vehicles 12, 14 in order to transfer charge energy from the traction battery pack 20 of the leading vehicle 12 or the trailing vehicle 14 to the traction battery pack 20 of the other of the leading vehicle 12 or the trailing vehicle 14. The charge cable 26 may be configured to provide any level of charging (e.g., Level 1 AC charging, Level 2 AC charging, DC charging, etc.).

The charging system of the leading vehicle 12 could optionally be equipped with a secondary charge port assembly 28. In an embodiment, the secondary charge port assembly 28 is mounted within a cargo space 30 of the leading vehicle 12 for providing access to a power source at an external location of the leading vehicle 12. A charge cable 32 may be connected to the secondary charge port assembly 28 and the charge port assembly 24 of the trailing vehicle 14 in order to transfer charge energy from the traction battery pack 20 of one of the leading vehicle 12 or the trailing vehicle 14 to the traction battery pack 20 of the other of the leading vehicle 12 or the trailing vehicle 14. The charge cable 32 may be configured to provide Level 1 or Level 2 AC charging, for example. In another embodiment, energy can be transferred between the leading and trailing vehicles 12, 14 using both the charge cable 26 and the charge cable 32. Although not specifically shown, the leading vehicle 12 and/or the trailing vehicle 14 could be equipped with one or more additional charging interfaces.

The respective charging systems of the leading and trailing vehicles 12, 14 may additionally include a bidirectional power transfer system 34 configured for enabling the bidirectional transfer of power between the vehicles 12, 14. The bidirectional power transfer system 34 may be operably connected between the charge port assembly 24 and the traction battery pack 20 of each of the leading vehicle 12 and the trailing vehicle 14. The bidirectional power transfer system 34 may include various equipment, such as a charger, a converter, a motor controller (which may be referred to as an inverter system controller or ISC), etc., arranged and configured to establish the bidirectional transfer of electrical energy between the respective traction battery packs 20 of the leading and trailing vehicles 12, 14. The bidirectional power transfer systems 34 may additionally be configured to transfer energy between the traction battery packs 20 and the electric machines of each respective vehicle.

One non-limiting example of a suitable bidirectional power transfer system that may be employed for use within the leading vehicle 12 and/or the trailing vehicle 14 for achieving bidirectional power transfer is disclosed within U.S. Patent Publication No. 2020/0324665, assigned to Ford Global Technologies, LLC, the disclosure of which is herein incorporated by reference. However, other bidirectional power transfer systems could also be utilized for achieving the bidirectional transfer of power between the leading and trailing vehicles 12, 14 within the scope of this disclosure.

FIG. 1 schematically illustrates a first in-flight configuration C1 of the system 10. During the first in-flight configuration C1, power may be transferred from the traction battery pack 20 of the leading vehicle 12 to the traction battery pack 20 of the trailing vehicle 14 (as schematically depicted by arrow 35).

FIG. 2 schematically illustrates a second in-flight configuration C2 of the system 10. During the second in-flight configuration C2, power may be transferred from the traction battery pack 20 of the trailing vehicle 14 to the traction battery pack 20 of the leading vehicle 12 (as schematically illustrated by arrow 37). In this way, the trailing vehicle 14 may charge the leading vehicle 12 during the in-flight towing and charging event in order to increase the towing distance that the leading vehicle 12 is capable of towing the trailing vehicle 14.

The teachings of this disclosure may be applicable for any type of vehicle as the leading vehicle 12 and for any type of vehicle as the trailing vehicle 14. For example, the leading vehicle 12 or the trailing vehicle 14 could be configured as a car, a truck, a van, a sport utility vehicle (SUV), etc.

The leading vehicle 12 of FIGS. 1-2 is schematically illustrated as a pickup truck, and the trailing vehicle 14 of FIGS. 1-2 is schematically illustrated as a car. Thus, the trailing vehicle 14 is the smaller of the two vehicles in the embodiment of FIGS. 1-2. However, the leading vehicle 12 could alternatively be configured as the smaller of the two vehicles, and the trailing vehicle 14 could be configured as the larger of the two vehicles (see, e.g., FIG. 3).

Figure 3:
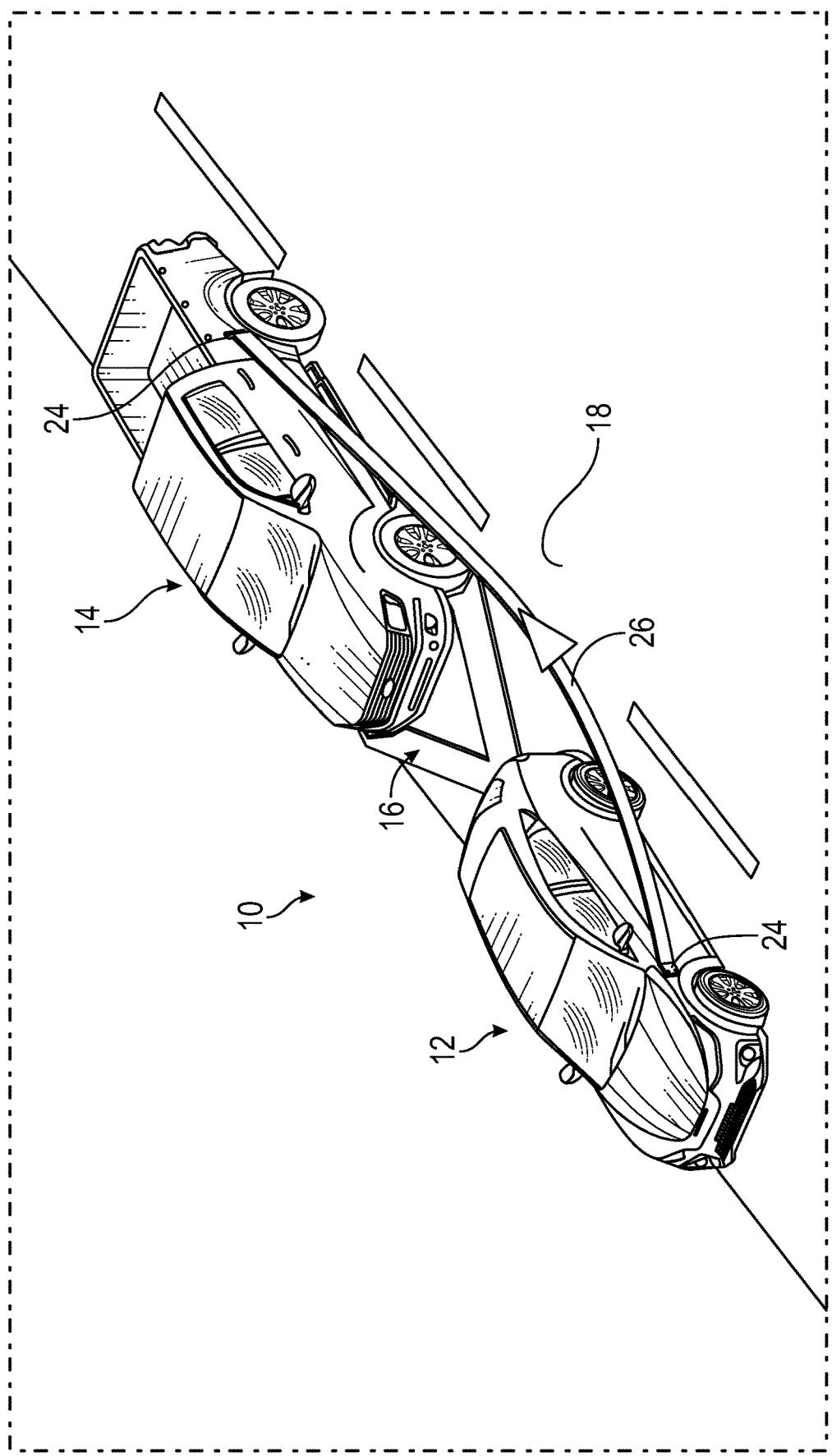
FIG. 3 schematically illustrates another towing event of a vehicle-to-vehicle energy transfer system.

In any of the scenarios depicted in FIGS. 1-3, the leading vehicle 12 could potentially require torque assistance from the trailing vehicle 14 for achieving adequate acceleration during select portions of the towing event. Torque assistance from the trailing vehicle 14 may be achieved by providing a propulsive torque (e.g., from an electric machine) to the wheels 15 of the trailing vehicle 14 to help "push" the leading vehicle 12 during the select portions of the towing event. For example, the torque assistance may be required to accelerate the leading vehicle 12 for reaching freeway speeds, passing another vehicle, or scaling a relatively steep grade of the roadway 18 during the towing event. The torque assistance may also be required during wheel slip conditions of the leading vehicle 12. This disclosure therefore describes exemplary embodiments for coordinating and providing torque assistance for accelerating the leading vehicle 12 during towing events.

Figure 4:
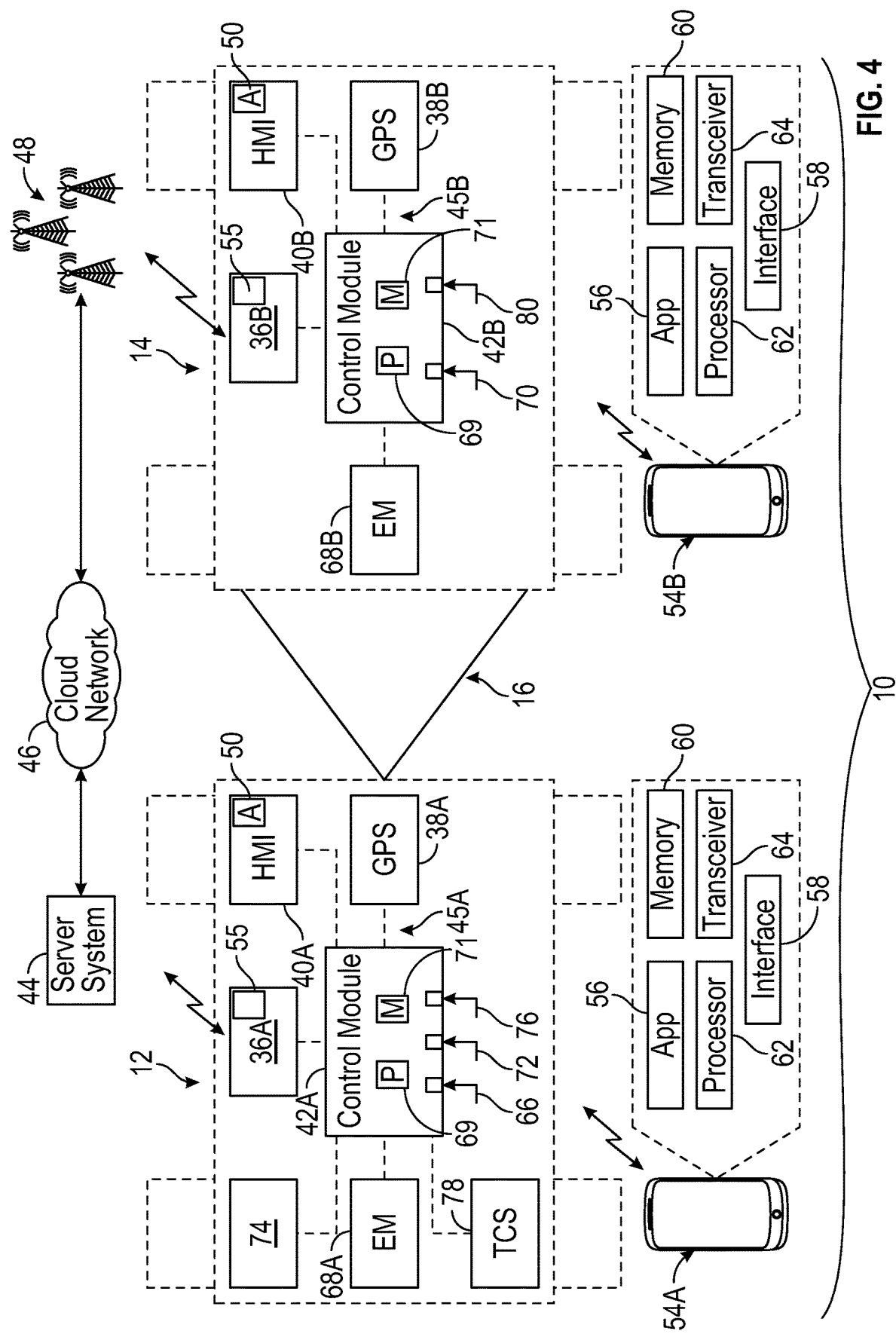
FIG. 4 schematically illustrates exemplary torque assistance aspects of a vehicle-to-vehicle energy transfer system.

Additional functionality of the system 10 of FIGS. 1-3 is further detailed in FIG. 4. In particular, FIG. 4 schematically illustrates features that enable the system 10 to provide torque assistance from the trailing vehicle 14 to the leading vehicle 12 for achieving adequate acceleration during select portions of a towing event between the respective vehicles. The torque assistance may be provided during the towing event whether or not energy is concurrently being supplied from the leading vehicle 12 to the trailing vehicle 14 or from the trailing vehicle 14 to the leading vehicle 12.

In an embodiment, the system 10 includes components from both the leading vehicle 12 and the trailing vehicle 14. For example, the leading vehicle 12 may include may include a telecommunications module 36A, a global positioning system (GPS) 38A, a human machine interface (HMI) 40A, and a control module 42A. These components may be interconnected and in electronic communication with one another over a communication bus 45A. The communication bus 45A may be a wired communication bus such as a controller area network (CAN) bus, or a wireless communication bus such as Wi-Fi, Bluetooth®, Ultra-Wide Band (UWB), etc.

As further part of the system 10, the trailing vehicle 14 may include a telecommunications module 36B, a global positioning system (GPS) 38B, a human machine interface (HMI) 40B, and a control module 42B. These components may be interconnected and in electronic communication with one another over a communication bus 45B. The communication bus 45B may be a wired communication bus such as a controller area network (CAN) bus, or a wireless communication bus such as Wi-Fi, Bluetooth®, Ultra-Wide Band (UWB), etc.

The telecommunications modules 36A, 36B may be configured for achieving bidirectional communication between the leading vehicle 12 and the trailing vehicle 14 over a cloud-based server system 44, such as for scheduling and executing in-flight vehicle-to-vehicle bidirectional energy transfers. Each telecommunications module 36A, 36B may communicate over a cloud network 46 (i.e., the internet) to obtain various information stored on the server system 44 or to provide information to the server system 44 that can subsequently be accessed by the leading vehicle 12 and/or the trailing vehicle 14 (or other participating vehicles). The server system 44 can identify, collect, and store user data associated with both the leading vehicle 12 and the trailing vehicle 14 for validation purposes. Upon an authorized request, data may be subsequently transmitted to the telecommunications modules 36A, 36B via one or more cellular towers 48 or via some other known communication technique (e.g., Wi-Fi, Bluetooth®, data connectivity, etc.). The information can then be communicated to the control module 46A, 46B for further processing. Each telecommunications module 36A, 36B can receive data from the server system 44 or communicate data back to the server system 44 via the cellular tower(s) 48. Although not necessarily shown or described in this highly schematic embodiment, numerous other components may enable bidirectional communication between the vehicles 12, 14 via the server system 44.

In an embodiment, a user/owner of the leading vehicle 12 and/or the trailing vehicle 14 may interface with the server system 44 using the HMI 40A, 40B. For example, each HMI 40A, 40B may be equipped with an application 50 (e.g., FordPass™ or another similar application) for interfacing with the server system 44. Each HMI 40A, 40B may be located within a passenger cabin of its respective vehicle and may include various user interfaces for displaying information to the vehicle occupants and for allowing the vehicle occupants to enter information into the HMI 40A, 40B. The vehicle occupants may interact with the user interfaces via touch screens, tactile buttons, audible speech, speech synthesis, etc.

In another embodiment, the user/owner of the leading vehicle 12 and/or the trailing vehicle 14 could alternatively or additionally interface with the server system 44 using a personal electronic device 54A, 54B (e.g., a smart phone, tablet, computer, wearable smart device, etc.). Each personal electronic device 54A, 54B may include an application 56 (e.g., FordPass™ or another similar application) that includes programming to allow the user to employ one or more user interfaces 58 for setting or controlling certain aspects of the system 10. The application 56 may be stored in memory 60 of the personal electronic device 54A, 54B and may be executed by a processor 62 of the personal electronic device 54A, 54B. Each personal electronic device 54A, 54B may additionally include a transceiver 64 that is configured to communicate with the server system 44 over the cellular tower(s) 48 or some other wireless link.

Each telecommunications module 36A, 36B may additionally include one or more wireless devices 55 that facilitate the detection of and communication with nearby vehicles, such as the leading vehicle 12 or the trailing vehicle 14, for example. Various information and signals may be exchanged between the leading vehicle 12 and the trailing vehicle 14 via the wireless devices 55. In an embodiment, the wireless devices 55 are Bluetooth® Low Energy (BLE) transceivers configured to receive and/or emit low energy signals as a way to detect and communicate with participating vehicles. However, other types of wireless devices (e.g., WiFi, V2V, etc.) are also contemplated within the scope of this disclosure for enabling bidirectional communication between the leading vehicle 12 and the trailing vehicle 14.

Each GPS 38A, 38B is configured to pinpoint an exact location of the leading vehicle 12 or trailing vehicle 14, such as by using satellite navigation techniques. In an embodiment, the location data from the GPS 38A and/or the GPS 38B may be utilized to aid in determining a grade of the roadway 18 that the vehicles are traveling along during the towing event.

The control modules 42A, 42B may each include both hardware and software and could be part of an overall vehicle control system, such as a vehicle system controller (VSC), or could alternatively be a stand-alone controller separate from the VSC. In an embodiment, each control module 42A, 42B is programmed with executable instructions for interfacing with and commanding operation of various components of the system 10. Although shown as separate modules within the highly schematic depiction of FIG. 4, the GPS, the HMI, and the control module could be integrated together as part of common module within each of the leading vehicle 12 and the trailing vehicle 14.

Each control module 42A, 42B may include a processor 69 and non-transitory memory 71 for executing various control strategies and modes associated with the system 10. The processors 69 can be custom made or commercially available processors, central processing units (CPUs), or generally any device for executing software instructions. The memory 71 can include any one or combination of volatile memory elements and/or nonvolatile memory elements. The processor 69 may be operably coupled to the memory 71 and may be configured to execute one or more programs stored in the memory 71 of each control module 42A, 42B based on the various inputs received from other devices.

In an embodiment, based at least on a first input signal 66 from an electric machine 68A (e.g., an electric motor) of the leading vehicle 12, the control module 42A may communicate (e.g., via the telecommunications modules 36A, 36B) a torque assistance request signal 70 to the control module 42B of the trailing vehicle 14. In an embodiment, the first input signal 66 is indicative of a predefined torque condition associated with the electric machine 68A of the leading vehicle 12. For example, the first input signal 66 may be communicated to the control module 42A when a torque output of the electric machine 68A is greater than or equal to 50% of the maximum torque output of the electric machine 68A. However, other thresholds may alternatively or additionally be programmed for establishing when the torque assistance request signal 70 is to be communicated from the leading vehicle 12 to the trailing vehicle 14.

In another embodiment, the control module 42A may communicate the torque assistance request signal 70 to the control module 42B of the trailing vehicle 14 in response to receiving a second input signal 72 from an accelerator pedal 74 of the leading vehicle 12. In an embodiment, the second input signal 72 is indicative of a predefined throttle condition associated with accelerator pedal 74 of the leading vehicle 12. For example, the second input signal 72 may be communicated to the control module 42A when a position of the accelerator pedal 74 (as detected by an accelerator pedal position sensor, for example) is greater than or equal to 50% of a maximum throttle petal position of the accelerator pedal 74. However, other thresholds may alternatively or additionally be programmed for establishing when the torque assistance request signal 70 is to be communicated from the leading vehicle 12 to the trailing vehicle 14.

In yet another embodiment, the control module 42A of the leading vehicle 12 may communicate the torque assistance request signal 70 to the control module 42B of the trailing vehicle 14 in response to receiving a third input signal 76 from a traction control system (TCS) 78 of the leading vehicle 12. In an embodiment, the third input signal 76 is indicative of a wheel slip condition of the leading vehicle 12, such as that which may occur when the leading vehicle 12 and trailing vehicle 14 are operating on a wet or otherwise slippery roadway and are stopped at a stoplight, operating on a relatively steep grade, etc., for example. The TCS 78 may communicate the third input signal 76 in response to any detected wheel slip condition.

The torque assistance request signal 70 indicates to the trailing vehicle 14 that the leading vehicle 12 requires torque assistance for achieving a desired level of acceleration during the towing event. For example, the torque assistance could be needed to accelerate to a freeway speed, pass another vehicle, ascend a steep grade, accommodate for wheel slip conditions, etc. In response to receiving the torque assistance request signal 70, the control module 42B of the trailing vehicle 14 may command an electric machine 68B (e.g., an electric motor) of the trailing vehicle 14 to turn on for powering one or more wheels 15 of the trailing vehicle 14. In this way, the trailing vehicle 14 may be operated in coordination with the leading vehicle 12 in order to contribute propulsive torque for helping accelerate the leading vehicle 12 during the towing event.

The amount of propulsive torque provided by the trailing vehicle 14 may vary depending on the torque output of the electric machine 68A of the leading vehicle 12. In an embodiment, the limit on the torque provided by the trailing vehicle 14 during the towing event is capped at 50% of the maximum torque output of the electric machine 68B. In another embodiment, the assistive propulsive torque provided by the trailing vehicle 14 is zero when at 50% of the maximum torque output of the electric machine 68A and approaches 100% when the maximum torque output of the electric machine 68A is reached. In another embodiment, the assistive propulsive torque provided by the trailing vehicle 14 may be controlled to match the current torque output of the leading vehicle 12. In yet another embodiment, the trailing vehicle 14 can provide an amount of propulsive torque that is necessary for accelerating the leading vehicle 12 at the level indicated by the current accelerator pedal position. Other methodologies are further contemplated within the scope of this disclosure.

In another embodiment, the control module 42B of the trailing vehicle 14 may be configured to control the torque output of the electric machine 68B in a specific way during detected wheel slip conditions of the leading vehicle 12. For example, the torque output of the electric machine 68B may be controlled to match a non-slipping wheel speed of the leading vehicle 12, thereby allowing the leading vehicle 12 to pull away from a stop or slope even during wet or slippery conditions.

The control module 42A of the leading vehicle 12 may communicate a torque assistance end signal 80 to the control module 42B of the trailing vehicle 14 when the leading vehicle 12 no longer requires torque assistance for acceleration. This may occur, for example, when the torque output of the electric machine 68A falls below 50% of the maximum torque of the electric machine 68A, when the position of the accelerator pedal 74 is moved to less than 50% of the maximum throttle pedal position of the accelerator pedal 74, when the leading vehicle 12 reaches a predefined speed or has not detected any wheel slippage for a predefined amount of time (e.g., 3 or more seconds), etc.

In another embodiment, the control module 42A of the leading vehicle 12 may communicate the torque assistance end signal 80 to the control module 42B of the trailing vehicle 14 when the acceleration of the leading vehicle 12 is within a predefined percentage (e.g., 2% to 50%) of a normal acceleration of the leading vehicle 12 for a given torque output of the electric machine 68A. The normal acceleration for any given torque output of the electric machine 68A may be information that is stored in a lookup table within the memory 71 of the control module 42A and that is accessible by the processor 69 for determining whether or not to communicate the torque assistance end signal 80 to the trailing vehicle 14.

The torque assistance end signal 80 indicates to the trailing vehicle 14 that the operating conditions of the leading vehicle 12 no longer indicate a need for torque assistance for accelerating during the towing event. In response to receiving the torque assistance end signal 80, the control module 42B of the trailing vehicle 14 may command the electric machine 68B of the trailing vehicle 14 to turn off and thus stop providing the torque assistance.

Figure 5:
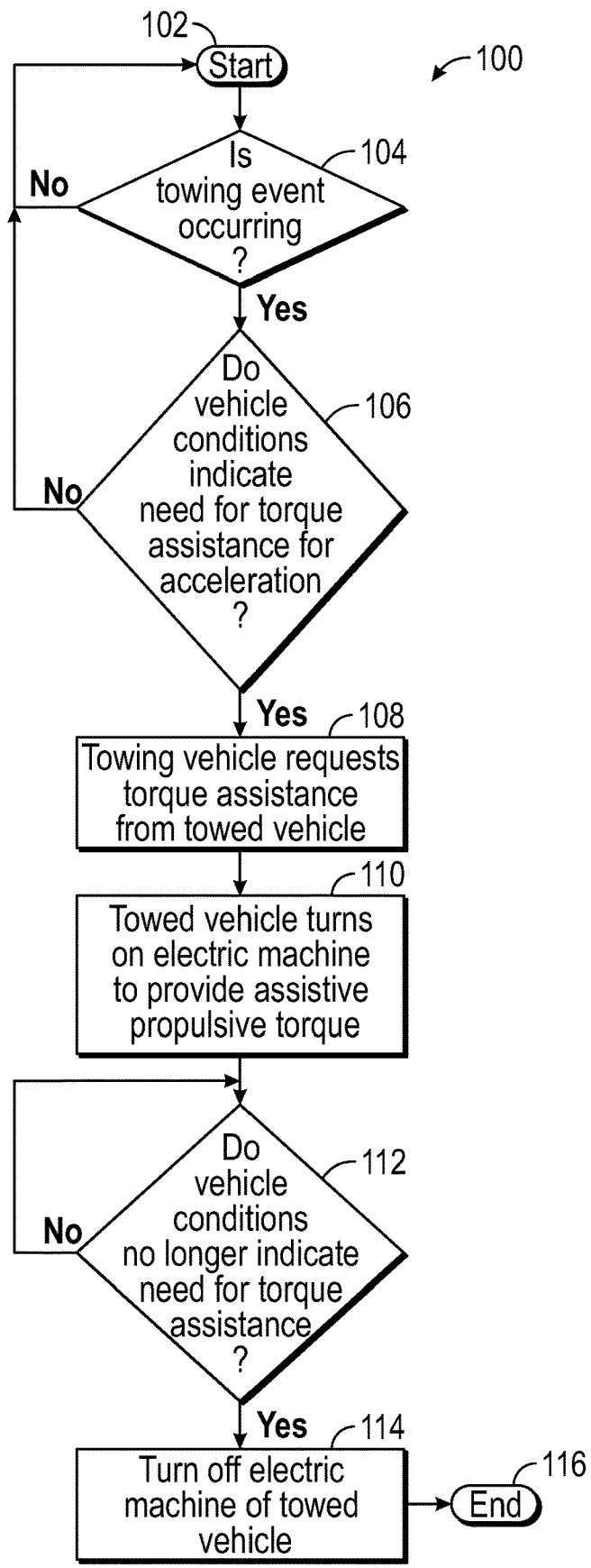
FIG. 5 schematically illustrates a flow chart of an exemplary method for providing torque assistance for accelerating a vehicle during vehicle towing events.

FIG. 5, with continued reference to FIGS. 1-4, schematically illustrates in flow chart form an exemplary method 100 for coordinating and providing torque assistance from the trailing vehicle 14 for accelerating the leading vehicle 12 during towing events in which the leading vehicle 12 is towing the trailing vehicle 14. The system 10 may be configured to employ one or more algorithms adapted to execute the steps of the exemplary method 100. For example, the method 100 may be stored as executable instructions in the memory 71 of each control module 42A, 42B, and the executable instructions may be embodied within any computer readable medium that can be executed by the processor 69 of each of the control modules 42A, 42B.

The exemplary method 100 may begin at block 102. At block 104, the method 100 may determine whether the leading vehicle 12 and the trailing vehicle 14 are engaged in a towing event. In an embodiment, the towing event is an in-flight bidirectional charging towing event in which the leading vehicle 12 and the trailing vehicle are connected by the towing device 16 and are further operably connected for achieving the bi-directional transfer of energy. It is noted, however, that energy does not need to be transferred continuously between the vehicles in order for the method 100 to be executed. Stated another way, there may be situations in which the leading vehicle 12 requires torque assistance for accelerating during the towing event but energy is not being concurrently transferred between the respective vehicles for charging purposes.

If a YES flag is returned at block 104, the method 100 may proceed to block 106 by determining whether any vehicle operating conditions associated with the leading vehicle 12 indicate a need for torque assistance in order to achieve a desired level of acceleration during the towing event. Exemplary operating conditions that may signify a need for torque assistance include but are not limited to torque conditions in which an output torque of the electric machine 68A exceeds a predefined threshold, throttle conditions in which a throttle position of an accelerator pedal 74 exceeds a predefined threshold, wheel slip conditions, etc.

If any detected vehicle condition of the leading vehicle 12 indicates the need for torque assistance at block 106, the leading vehicle 12 may communicate the torque assistance request signal 70 to the trailing vehicle 14 at block 108. In response to receiving the torque assistance request signal 70, the trailing vehicle 14 may command the electric machine 68B to be turned on in order to provide a desired torque output for providing an assistive propulsive torque to one or more wheels 15 of the trailing vehicle 14 at block 110. The assistive propulsive torque helps to accelerate the leading vehicle 12 during the towing event.

The method 100 may thereafter determine whether the vehicle conditions no longer indicate the need for continuing the torque assistance at block 112. The vehicle conditions may indicate that the need no longer exists for providing the torque assistance in various ways. For example, torque assistance may no longer be needed when the output torque of the electric machine 68A is below a predefined threshold, the throttle position of the accelerator pedal 74 is below a predefined threshold, wheel slip conditions have ceased, etc. In another embodiment, the method 100 may determine that the assistive torque is no longer required when the acceleration of the leading vehicle 12 is within a predefined percentage of a normal acceleration of the leading vehicle 12 for a given torque output of the electric machine 68A.

If torque assistance is no longer required, the trailing vehicle 14 may command the electric machine 68B to be turned off at block 114. When turned off, the electric machine 68B no longer provides acceleration assistance to the leading vehicle 12. The method 100 may thus end at block 116.

The vehicle-to-vehicle (V2V) in-flight energy transfer systems of this disclosure are designed to provide bidirectional charging while the participating vehicles are making forward progress toward their respective destinations. The systems are further configured to provide torque assistance to the leading/towing vehicle during the towing event. The torque assistance can help accelerate the leading/towing vehicle during various driving situations which might call for acceleration.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle-to-vehicle in-flight energy transfer system, comprising:
a towing vehicle;
a towed vehicle; and
a control module programmed to request a torque assistance from the towed vehicle for assisting with acceleration of the towing vehicle in response to a predefined torque condition in which a torque output of an electric machine of the towing vehicle exceeds a predefined maximum torque threshold, or in response to a wheel slip condition in which a wheel of the towing vehicle is slipping while the towing vehicle is either stopped or operating on a graded portion of a roadway.

2. The system as recited in claim 1, wherein the towing vehicle is a smaller vehicle than the towed vehicle.

3. The system as recited in claim 1, wherein the towed vehicle is coupled to the towing vehicle by a towing device during a towing event in which the torque assistance is requested.

4. The system as recited in claim 3, wherein the towing event is an in-flight bidirectional charging towing event.

5. The system as recited in claim 1, wherein the control module is a component of the towing vehicle.

6. The system as recited in claim 1, wherein the control module is programmed to request an end to the torque assistance when the predefined torque condition, or the wheel slip condition ceases.

7. The system as recited in claim 1, wherein the control module is programmed to communicate a torque assist request signal to the towed vehicle for requesting the torque assistance.

8. The system as recited in claim 7, wherein the control module is programmed to communicate a torque assist end signal to the towed vehicle for ending the torque assistance.

9. The system as recited in claim 8, wherein the torque assist end signal is communicated when a torque output of the electric machine of the towing vehicle falls below a predefined maximum torque, when a position of an accelerator pedal is less than a predefined maximum throttle pedal position, when the towing vehicle reaches a predefined speed, or when wheel slippage of the towing vehicle has not been detected for a predefined amount of time.

10. The system as recited in claim 8, wherein the torque assist end signal is communicated when the acceleration of the towing vehicle is within a predefined percentage of a normal acceleration of the towing vehicle for a given torque output of the electric machine of the towing vehicle.

11. The system as recited in claim 4, wherein the in-flight bidirectional charging towing event is an event in which the towing vehicle is towing the towed vehicle and charging energy is being transferred either from the towing vehicle to the towed vehicle or from the towed vehicle to the towing vehicle.

12. The system as recited in claim 11, comprising a charging cable connected to a first charge port assembly of the towing vehicle and a second charge port assembly of the towed vehicle and configured to transfer the charging energy between the towing vehicle and the towed vehicle during the in-flight bidirectional charging towing event.

13. An electrified vehicle, comprising:
a wheel;
an electric machine for selectively providing a propulsive torque for propelling the wheel; and
a control module programmed to control the electric machine for providing the propulsive torque in response to receiving a torque assistance request signal during a towing event
wherein the torque assistance request signal is indicative of a torque condition in which an electric machine of a towing vehicle involved in the towing event exceeds a predefined maximum torque threshold, or a wheel slip condition in which a wheel of the towing vehicle is slipping while the towing vehicle is either stopped or operating on a graded portion of a roadway.

14. The electrified vehicle as recited in claim 13, wherein the torque assistance request signal is received from +the towing vehicle.

15. The electrified vehicle as recited in claim 14, comprising a telecommunications module configured for establishing bidirectional communications between the electrified vehicle and the towing vehicle.

16. The electrified vehicle as recited in claim 13, wherein the control module is a component of the electrified vehicle being towed during the towing event.

17. The electrified vehicle as recited in claim 13, wherein the control module is programmed to control the electric machine for stopping the propulsive torque in response to receiving a torque assistance end signal during the towing event.

18. A method, comprising:
providing a torque assistance from thea towed vehicle for aiding acceleration of the towing vehicle in response to a predefined torque condition, a predefined throttle condition, or a wheel slip condition of the towing vehicle,
wherein the torque assistance is provided during an in-flight bidirectional charging towing event in which the towing vehicle is towing the towed vehicle and charging energy is being transferred either from the towing vehicle to the towed vehicle or from the towed vehicle to the towing vehicle.

19. The method as recited in claim 18, wherein the predefined torque condition is a condition in which a torque output of an electric machine of the towing vehicle exceeds a predefined maximum torque threshold.

20. The method as recited in claim 18, wherein the wheel slip condition is a condition in which a wheel of the towing vehicle is slipping while the towing vehicle is either stopped or operating on a graded portion of a roadway.

* * * * *